DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JANUARY 6, 1970

870 O.G. 17

T870,002

PRODUCTION OF PERMANENTLY PRESSED OR CREASED FABRICS

John H. Davis, 2375 Mountain Drive 37664, and Charles H. Coney, 2008 Canterbury Road 37660, both of Kingsport, Tenn.

Filed Sept. 11, 1968, Ser. No. 759,239
Int. Cl. D06m *1/24*
U.S. Cl. 117—11
No Drawing. 9 Pages Specification

A method of treating a fabric containing cellulosic or natural fibers is disclosed. The method comprises applying to the fabric to be treated a tertiary amine oxide which is a solvent for the fabric, and subsequently applying heat and pressure to the tertiary amine oxide-containing fabric to partially solvate or temporarily soften the fabric and provide a permanent press or crease thereto. The treated fabric may then be rinsed to remove the tertiary amine oxide. The heat press may be applied either to a fold in the fabric to form a permanent crease, or to a flattened area to form a wrinkle-resistant fabric. Fabrics treated in this manner are not subject to degradation by chlorine since the oxide may be worked out. Examples of tertiary amine oxides which may be used include N-methylmorpholine-N-oxide, trimethyl amine oxide, triethyl amine oxide, tripropyl amine oxide, and the like.